US011928154B2

(12) United States Patent
Bucao et al.

(10) Patent No.: US 11,928,154 B2
(45) Date of Patent: Mar. 12, 2024

(54) SYSTEM AND METHOD FOR EFFICIENT CREATION AND INCREMENTAL UPDATING OF REPRESENTATIONS OF EMAIL CONVERSATIONS

(71) Applicant: CS DISCO, INC., Austin, TX (US)

(72) Inventors: Levi Jonathan Bucao, Austin, TX (US); Peter Anthony Lee, Pflugerville, TX (US); Ajay Guyyala, Cedar Park, TX (US)

(73) Assignee: CS DISCO, INC., Austin, TX (US)

( * ) Notice: Subject to any disclaimer, the term of this patent is extended or adjusted under 35 U.S.C. 154(b) by 299 days.

(21) Appl. No.: 17/187,116

(22) Filed: Feb. 26, 2021

(65) Prior Publication Data

US 2022/0277158 A1 Sep. 1, 2022

(51) Int. Cl.
*G06F 16/93* (2019.01)
*G06F 16/901* (2019.01)

(52) U.S. Cl.
CPC .......... *G06F 16/9024* (2019.01); *G06F 16/93* (2019.01)

(58) Field of Classification Search
CPC .............................. G06F 16/9024; G06F 16/93
See application file for complete search history.

(56) References Cited

U.S. PATENT DOCUMENTS

| 9,686,308 | B1 * | 6/2017 | Srivastava | .............. H04L 12/14 |
| 2007/0011649 | A1 * | 1/2007 | Venolia | ..................... G06F 8/20 717/109 |
| 2007/0011659 | A1 * | 1/2007 | Venolia | ................. G06F 16/904 707/E17.011 |
| 2010/0211924 | A1 * | 8/2010 | Begel | .................... G06F 16/904 707/E17.069 |
| 2013/0124548 | A1 * | 5/2013 | Chhaparia | ............ G06Q 10/103 707/758 |
| 2014/0297637 | A1 * | 10/2014 | Adachi | ................. G06F 16/245 707/736 |

* cited by examiner

*Primary Examiner* — Keith D Bloomquist
(74) *Attorney, Agent, or Firm* — Sprinkle IP Law Group

(57) ABSTRACT

Embodiments as disclosed include document analysis systems that may obtain email data collected or obtained from email servers from one or more source systems and build a graph of the emails, where the nodes of the email graph represent data about an email and the edges in the graph between the nodes of the graph are determined based on metadata associated with the emails or the text content of the emails. These email graphs may be quickly and efficiently updated as new email data is obtained such that the document analysis systems may organize emails into conversations for utilization by users in reviewing these emails in context.

21 Claims, 8 Drawing Sheets

| PDF | Text |

204

◀ 1 page 100 ▶

CONVERSATION TREE
202

From: Sever Stephanie
Sent: Tuesday, January 22, 2002 6:16 PM CST
To: Keiser, Kam
Subject: RE: traders
Importance: Low Thank you -----Original Message-----
From: Keiser, Kam
Sent: Tuesday, January 22, 2002 4:12 PM
To: Sever, Stephanie; Kenne, Dawn C.
Subject: traders FYI.....
We will probably have some changes to the trader matrix, we have had some traders quit or decide to stay with the estate. Once we know for sure, we will send you the new breakout.
Thanks,
Kam ..........
EDRM Enron Email Data Set has been produced in EML, PST and NSF format by ZL Technologies, Inc. This Data Set is licensed under a Creative Commons Attribution 3.0 United States License <http://creativecommons.org/licenses/by/3.0/us/>. To provide attribution, please cite to "ZL Technologies, Inc. (http://www.zlti.com)."
..........

RELATED DOCUMENTS  ◁

No family members

Conversation (2 of 6)
- Keiser ♘ 5
  01/23/2002 12:12 AM CST
- ☆ Sever Stephanie ♘ 5
  01/22/2002 6:16 PM CST
- Kenne Dawn C. ♘ 2
  01/22/2002 6:27 PM CST
- Email not collected
  - ☆ Kenne Dawn C. ♘ 2
    01/22/2002 6:28 PM CST
- Keiser ♘ 3
  01/23/2002 12:28 AM CST
  - ☆ Kenne Dawn C.
    01/22/2002 6:30 PM CST No similar documents

METADATA  204

Doc ID           2952
Pages            1
Custodian        Kam Keiser
Bates No.        :
Tags             None
From             Sever Stephanie <Stephanie.Sever@site.com>
Sent             1/22/2002 6:16 PM CST

FIG. 4 email_info
- PK: matter_uuid (CK)
- dock_id
- normalized_subject
- send_timestamp
- text_segment conv_stage_cull
- matter_uuid (CK)
- session_id
- doc_id text_segments
- PK: matter_uuid (CK)
- dock_id (CK)
- segment_index
- text_segment
- extracted_send_timestamp text_segments_stage
- matter_uuid (CK)
- doc_id
- normalized_subject
- overall_send_timestamp
- text_segment
- segment_index
- extracted_send_timestamp smtp_mapi_lookup
- PK: matter_uuid (CK)
- smtp_id
- mapi_id final_graph
- PK: matter_uuid (CK)
- doc_id
- conv_id (CK)
- is_reply_to
- smtp_weight
- mapi_weight
- content_weight
- conv_count
- is_inclusive
- subsumed_by conv_stage
- matter_uuid (CK)
- session_id
- doc_id
- smtp_id
- mapi_id
- is_smtp_reply_to
- is_mapi_reply_to
- is_content_reply_to doc_mapi_lookup
- PK: matter_uuid (CK)
- doc_id
- mapi_id edges
- PK: matter_uuid (CK)
- from_node
- to_node
- smtp_weight
- mapi_weight
- content_weight doc_smtp_lookup
- PK: matter_uuid (CK)
- doc_id
- smtp_id

CK: CLUSTERING/DISTRIBUTION/ PARTITION KEY
PK: PRIMARY KEY

SYSTEM AND METHOD FOR EFFICIENT CREATION AND INCREMENTAL UPDATING OF REPRESENTATIONS OF EMAIL CONVERSATIONS

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to analysis and understanding of electronic documents. In particular, this disclosure relates to the analysis and understanding of emails. Even more specifically, this disclosure relates to the efficient creation and update of representation of email conversations in document analysis systems.

BACKGROUND

In the modern world, the vast majority of documents that are being created, utilized, and maintained, are in electronic format. A number of different situations commonly arise that require an analysis or identification of certain relevant electronic documents from a relatively large pool of available electronic documents. These situations are generally referred to as information retrieval or search problems. These types of search problems crop up in a wide variety of contexts. For example, in litigation, an entity's documents may need to be reviewed in order to identify documents that may be relevant to one or more issues in the litigation. In other examples, certain regulatory filings may require review of a number of documents to identify documents that may be relevant to one or more issues in the regulatory filing.

To illustrate in more detail, parties to litigation typically have to share relevant evidence with opposing counsel through the discovery process. In many cases, each party makes a reasonable search of their records based on some set of terms or keywords and produces the results of the search to the other party. Discovery thus typically involves the gathering of potentially relevant materials, much of it digital, and then reviewing such materials to determine what to be shared with opposite parties. Additionally, during the course of the litigation each party may continually review those documents produced by the opposing party to locate documents relevant to the case at hand. Litigation thus represents a microcosm of a more general problem raised by the high volume of electronic documents present in a variety of contexts. Namely, how can a large volume of electronic documents be understood, reviewed, or searched in order that documents relevant to a particular topic or user's interest may be located.

To aid users in resolving these problems, a document analysis system may be provided in a given electronic context. A document analysis, document review, information retrieval, or search system (which all will be utilized here substantially interchangeably) is a computer system to process a corpus of electronically stored information (referred to as the corpus) and allow users to analyze, review or navigate the information, or search the electronic information to return electronically stored information responsive to a search (also referred to as a query). Items of electronic information that form a corpus may be referred to interchangeably as (electronic) documents, items, files, objects, items, content, etc. and may include objects such as files of almost any type including documents for various editing applications, emails, workflows, etc.

Emails are a problematic subset of the documents analyzed by such a document analysis system as the nature of emails usually results in computationally intensive and slow analysis of such emails. It would thus be desirable to have improved systems and methods for document analysis of email data that can, for example, efficiently construct and incrementally update representations of conversations within such emails.

SUMMARY

To continue with the above discussion, a document analysis system processes a corpus of electronically stored information including electronic documents and allows users to analyze, review, navigate or otherwise access or manipulate these documents or associated data. Emails are a problematic subset of the documents analyzed by such a document analysis system. Emails are ubiquitous within almost all modern enterprises, serving as the almost de-facto form of communication in such enterprises. It is thus often required to obtain and review such emails in the course of a litigation or other type of document review. As such, a document analysis system may provide a mechanism by which users can be presented with these emails and review such emails and associated data.

In many cases it is desirable for document analysis systems to identify and present such emails in the form of "conversation trees", where each conversation tree represents a conversation comprised of a set of associated emails that include an original or root email, (the beginning of the conversation) and all of the subsequent replies and forwards transitively associated with that original email.

The determination of such email conversations from email data in the document analysis environments is often times complex. Email data may comprise email metadata, or the actual emails document themselves, of a large volume of emails (e.g., on the order of hundreds of thousands or millions in some cases). Construction of the conversation trees requires the determination of associated emails and the original or root email of such a conversation tree from a large volume of email data. The processing of such email data may thus be computing time and resource intensive.

Complicating these determinations is the consideration that email data may be retrieved from different email servers (e.g., of different types) at different times. Thus, the conversation trees determined at one point may be incomplete and new email data regarding such conversation trees may be obtained at (e.g., multiple) subsequent times. Accordingly, such document analysis systems may be required to frequently identify conversation trees pertaining to newly obtained email data and update the identified conversation trees. Because this newly obtained data may be less voluminous (e.g., than the number of emails already processed), users may expect that these incremental additions may be ingested quite quickly. However, typical methods for the incremental identification and update of such conversation trees may have less then desirable performance (e.g., from a computing time and resource standpoint).

Other factors also complicate the document analysis of emails in such document analysis systems. Namely, if such emails are obtained from multiple email servers for multiple user accounts of various users in an enterprise, there is likely to be a significant degree of duplicity of the emails between users. Duplicity may occur, for example, because the same email is sent to a number of recipients at once or because it is often the case that emails quote or include the text of previous emails (e.g., when responding or forwarding an email) and therefore may contain large amounts of duplicative content.

From a user's perspective it is desirable that such emails including duplicative content are identified by the document analysis system such that the user may review such duplicative content only once. In other words, if an inclusive email (e.g., and any included or subsumed emails) are identified to a user, the user may review all that content in the identified inclusive email and avoid having to review other emails identified as included in an inclusive email. The identification of such inclusive (or subsumed) emails is, however, not a trivial task, being quite computationally expensive, especially when such incremental updates to the email data as discussed above are taken into account.

It would thus be desirable to have improved systems and methods for document analysis of email data that can efficiently construct and incrementally update representations of email conversations.

To those ends, among others, attention is directed to embodiments of the document analysis systems disclosed herein. Embodiments of such document analysis systems may obtain email data on emails from source systems and organize and analyze such emails to allow users to review such email using the system. Such a document analysis system may be, for example, a multi-tenant platform that provides document analysis services to users from multiple (e.g., distinct) tenants, including allowing users of these tenants to access and review emails and email data associated with the tenant. For example, in a litigation context such a tenant may be a law firm or other organization reviewing emails associated with a third-party entity such as a party to litigation or a third-party entity subject to a subpoena.

To provide such capabilities, the document analysis system may include a conversation service that organizes emails into conversations so the document analysis system can display these emails in the context of an associated email conversation and allow users to view the conversations and review the emails in the context of these conversations. Specifically, the conversation service may obtain email data collected or obtained from email servers from one or more source systems (e.g., email servers in one or more locations). The conversation service builds a graph of the emails, where the nodes represent data about an email and the edges (connections) in the graph between the nodes of the graph are determined based on metadata associated with the emails or the text content of the emails.

Moreover, a weighting heuristic may be applied to determine weights associated with edges of the graph, or to identify relationships (e.g., reply relationships) between the emails. Using such a graph, conversations within the email graph may be determined by evaluating the graph to determine conversation trees within the graph. Each conversation tree within the graph representing an email conversation may comprise, for example, a disconnected portion of the graph comprising a set of nodes, including a root node, and a set of edges representing relationships between those nodes. The emails of the conversation represented by the conversation tree may then be evaluated to determine which of those emails are inclusive (or subsumed) and the nodes representing those inclusive (or subsumed) emails marked in the conversation tree.

In particular, in one embodiment, to increase efficiency, especially with respect to the presentation of the emails and related conversations in a user interface, the conversation service may utilize two email graphs, a raw graph comprising nodes representing data on emails from various different sources and a simplified graph derived from the raw graph. The raw graph may also include edges representing relationships between the nodes, with equivalence edges or relationships relating equivalent nodes related to the same email and reply edges or relationships between two nodes, where one node of the two nodes joined by the reply relationship represents email data on a first email that is a reply to a second email represented by the second node joined by the relationship, where the second node represents email data on the second email. Such a raw graph may thus include multiple nodes representing the same email and associated with different types of data which may be obtained from different sources (or from the same source). There may also be a weighting on reply edges denoting, for example, a sum of the signals representing a likelihood of that reply relationship.

Thus, it will also be noted that because the evaluation of email data to determine reply relationships may be based on various heuristics and there may be a weighting assigned to each reply relationship, in many cases there may be multiple reply relationships in the raw graph associated with a single node, each with an associated weighting. In other words, the raw graph may denote that a particular email (represented by a node) may be a reply to multiple different emails (e.g., represented by distinct nodes), with the weighting on each reply relationship denoting a likelihood or sum of signals for that reply relationship.

Because of the details which the raw graph represents such a raw graph may prove difficult or inefficient to navigate when manipulating or evaluating such email data for use in providing email analysis or presenting such email data in a user interface (e.g., when real-time or near real-time processing may be desired). Therefore, embodiments of the conversation service may also utilize a simplified graph derived from the raw graph. The simplified graph includes nodes representing distinct emails and reply relationships between these nodes. Specifically, in certain embodiments, the simplified graph may include email nodes that represent equivalent nodes of the raw graph (e.g., nodes of the raw graph which have equivalency relationships between them) collapsed into a single node and reply relationships edges between the email nodes. For the simplified graph, the reply edges may also be collapsed and can then be pruned based on the weighting associated with the resulting reply edge such that each email node has at most one incoming reply edge (e.g., an email can be a reply to only one other email). Using the simplified graph then, conversations may be determined by evaluating the simplified graph to determine conversation trees within the graph. This evaluation may be done, for example, by traversing the simplified graph of trees using a depth first search or other traversal mechanism.

Again, each conversation tree within the simplified graph representing an email conversation may comprise, for example, a disconnected subgraph of the simplified graph comprising a set of nodes, including a root (or "initiator") node, and a set of edges representing relationships between those nodes. The simplified graph may therefore include a set of subgraphs where each subgraph is a conversation tree representing an email conversation. The emails of the conversation represented by the conversation tree may then be evaluated to determine which of those emails are inclusive (or subsumed) and the nodes representing those inclusive (or subsumed) emails marked in the conversation tree of the simplified graph. As the simplified graph comprises all the data of a single email (e.g., the reference to the email document, the email metadata, etc.) in a single node, this simplified graph may now be efficiently traversed and used to provide efficient document analysis and review for email conversations to a user of the document analysis system. Specifically, it may be easier to give preference to email document nodes, or determine when an email document for an email has been obtained.

As discussed, however, in many cases email data may be retrieved or obtained from different email servers (e.g., of different types) at different times. Thus, the conversation trees of the simplified graph determined at one point may be incomplete and new email data regarding such conversation trees may be obtained at (e.g., multiple) subsequent times. Accordingly, such document analysis systems may be required to frequently identify conversation trees pertaining to newly obtained email data and update the identified conversation trees.

However, because the simplified graph may collapse or eliminate some of the data of the raw graph (e.g., weak reply relationships) a problem may now occur in which the simplified graph does not contain enough data to facilitate the efficient incremental update of the simplified graph when such new email data is obtained. Accordingly, when new email data is received, the raw graph may be utilized to perform an incremental update to the simplified graph.

According to particular embodiments, then, an incremental raw graph may be determined from the new email data. Specifically, a node may be determined to add to the incremental raw graph based on the identification of a new email from either obtained new email metadata or an obtained new email document. Alternatively the node may represent newly identified email data (e.g., an email document or email metadata) pertaining to an email already represented by one or more nodes of the raw graph. New edges to add to the raw graph may be determined and added to the incremental raw graph based on the email data associated with the newly determined node. These new edges may include new equivalency edges representing other existing nodes in the raw graph that represent email data for the same email or a reply relationship edge between the new node and a second node of the raw graph representing another email. These new edges and determined second node may be added to the incremental raw graph. Each of the edges of the incremental raw graph can then be followed recursively using the raw graph and each node and relationship transitively connected to the new node in the raw graph may be added to the incremental raw graph.

Once the incremental raw graph is determined it can be transformed into an incremental simplified graph by collapsing the equivalent nodes of the incremental raw graph to get one single node in the incremental simplified graph representing all equivalent nodes in the incremental raw graph. Additionally, a best reply relationship edge may be selected between any two nodes based on the sum of the weights of all the reply relationship edges between all equivalent nodes for those two nodes (e.g., the nodes collapsed to form those two nodes) in the incremental raw graph. The determined best reply relationship edges are then added to the incremental simplified graph.

This incremental simplified graph can then be traversed to determine conversations within the incremental simplified graph and assign identifiers to all the nodes of each conversation tree within the incremental simplified graph. Such a traversal may determine each node of the incremental simplified graph that is a root node (e.g., have no reply relationship edges specifying that node as a reply and representing an originator email) and beginning with each of those nodes traverse the associated conversation tree originating with the node. Such a traversal may, in one embodiment, be done by a recursive common table expression (CTE) in order to efficiently implement such a traversal. A conversation identifier may be, for example, an identifier of the root node (e.g., representing an originator email) of the conversation tree that is propagated to each of the nodes of the conversation tree subgraph during traversal.

This traversed incremental simplified graph can then be used to detect inclusive or subsumed emails in embodiments. Specifically, for a conversation tree in the incremental simplified graph each of the branches of the conversation tree may be identified (e.g., where a node of the conversation tree may be associated with one or more branches). The text of the emails of each branch can then be analyzed to determine if the text of any email represented by a node of the branch is duplicated in any descendant of the branch. Based on this determination, the nodes of the branch may be annotated to indicate that the email represented by the node is inclusive or subsumed. This annotated and traversed incremental simplified graph can then be used in presenting an interface corresponding to any of the conversations trees represented in the incremental simplified graph. Moreover, the incremental raw graph and the incremental simplified graph may then be used to update the raw graph and simplified graph respectively such that both the raw graph and the simplified graph may be incrementally updated based on newly received email data.

In this manner, then, the document analysis system (and thus users of such a document analysis system) may quickly obtain, analyze, or otherwise utilize, new email data, without the need to reconstruct or traverse the entirety of data structures (e.g., graphs) representing the entirety of the email data obtained from source systems. Instead, such data structures may be efficiently and incrementally updated utilizing incremental data structures representing only portions of the data structures that will need to be altered based on the newly obtained data.

Moreover, through the use of the encoding of the data structures utilized by embodiments and the data stores or engines used to store and manipulate such data structures, embodiments may provide the advantages that the processing of email data and the manipulation of the representations of email conversations may be efficiently implemented in a distributed or data-local manner using a database engine that may be part of a database platform such as a database as a service. Additionally, in instances where the document analysis system is a multi-tenant platform, the processing may be accomplished as single (or fewer) job executions that can be more efficiently processed for multiple tenants.

Thus, embodiments may reduce the time required to organize an email dataset into conversations and identify emails with unique text content. Users are able to see how emails relate to each other soon after adding them to the dataset, even when the dataset is large. They are also able to see which emails have unique text content and which emails do not. This allows users of such document analysis systems to more quickly begin review of such documents and to better ascertain the emails they may need to review.

In one embodiment, a system for document analysis can include a data store having an email graph where the document analysis system is adapted to incrementally update the email graph based on email data. The email data can be obtained an incremental graph comprising a set of nodes representing emails, and edges representing relationships between the emails, can be determined. The determination of the incremental graph may include determining a first node for the incremental graph, wherein the first node represents a first email determined from the obtained email data, adding the first node to the incremental graph, and determining one or more edges for the incremental graph. The one or more edges can include at least one edge determined by determining a candidate edge for the incremental graph based on a comparison of first text of the first email to second text of a second email represented by a second node in the email graph or the incremental graph, and adding the candidate edge to the incremental graph as one of the one or more edges.

Starting with the one or more edges in the email graph, the email graph can be traversed to determine a related set of nodes and a related set of edges of the email graph to add to the incremental graph, where the related set of nodes and a related set of edges of the email graph are directly or indirectly related to the one or more edges. These related set of nodes and related set of edges determined from the email graph can be added to the incremental graph and the incremental graph traversed to identify a set of conversations in the incremental graph, each of the set of conversations comprising a subgraph of the incremental graph. The identified set of conversations can be updated in the email graph based on the incremental graph to incrementally update the email graph based on the obtained email data.

In some embodiments, the data store comprises a columnar data store. In certain embodiments, the data store is part of a database system comprising a database system including a database engine, wherein the incremental graph is determined at least partially using the database engine.

In embodiments the email graph comprises a raw graph and a simplified graph, and the incremental graph comprises an incremental raw graph and an incremental simplified graph. In one embodiment, the incremental simplified graph is determined by collapsing the nodes and edges of the incremental raw graph. In a particular embodiment, the incremental simplified graph is traversed to identify the set of conversations in the incremental graph.

According to one embodiment, the subgraph of each conversation can be traversed to identify each node of the conversation for the subgraph that represents an inclusive email.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions, or rearrangements may be made within the scope of the invention, and the invention includes all such substitutions, modifications, additions, or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 2 is depiction of one embodiment an interface that may be utilized by a document analysis system to present email data.

FIG. 4 is a depiction of a table schema that may be utilized by embodiment of a document analysis system.

DETAILED DESCRIPTION

Figure 1:
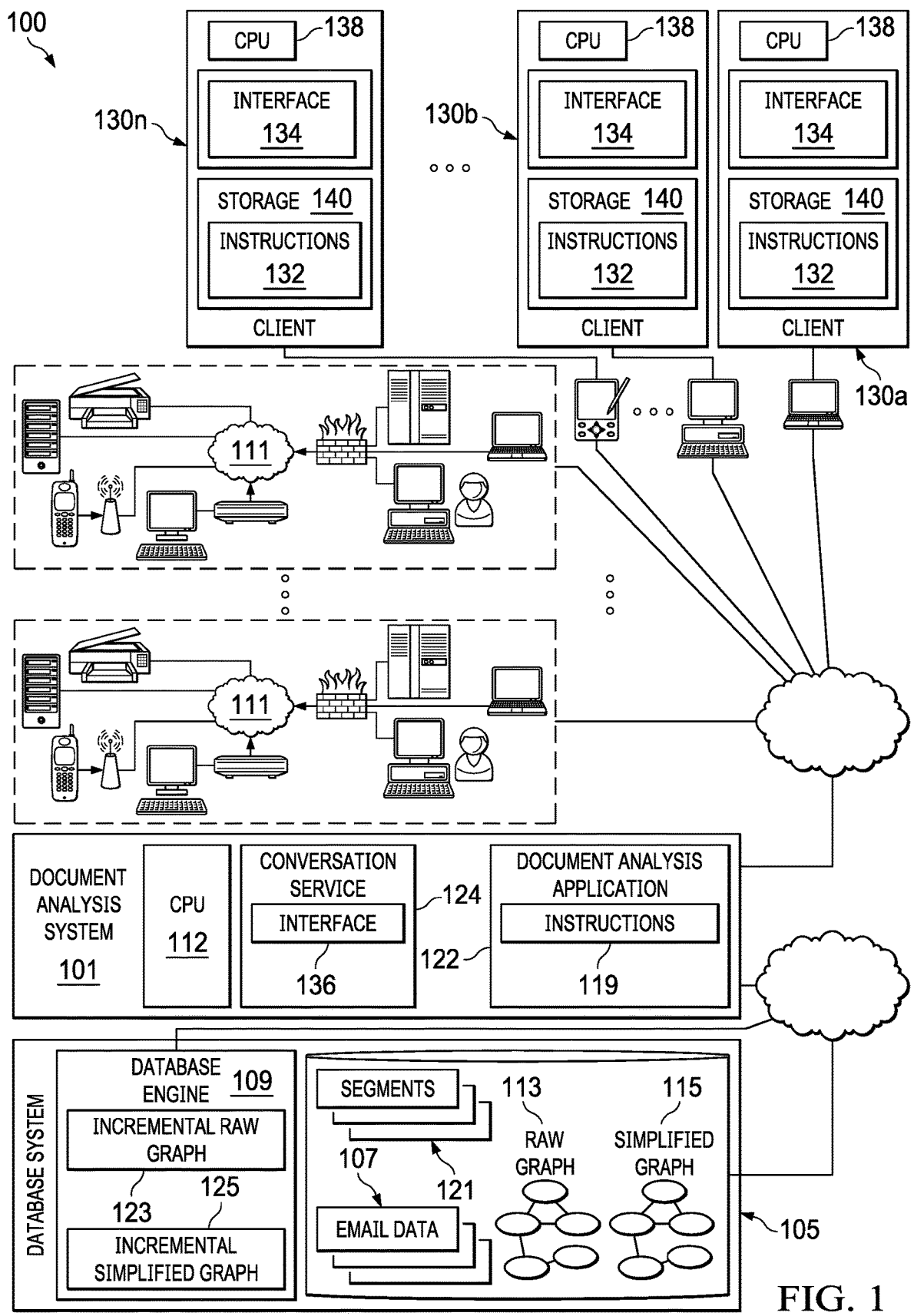
FIG. 1 is a block diagram of one embodiment of an architecture including a document analysis system.

The disclosure and various features and advantageous details thereof are explained more fully with reference to the exemplary, and therefore non-limiting, embodiments illustrated in the accompanying drawings and detailed in the following description. It should be understood, however, that the detailed description and specific examples, while indicating the preferred embodiments, are given by way of illustration only and not by way of limitation. Descriptions of known programming techniques, computer software, hardware, operating platforms, and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before describing embodiments in more detail, it may be helpful to discuss some context around document analysis systems. As mentioned above, the vast majority of documents that are currently being created, utilized, and maintained are in electronic format. A number of different situations commonly arise that require an analysis or identification of certain relevant electronic documents from a relatively large pool of available electronic documents. For example, in litigation, an entity's documents may need to be reviewed in order to identify documents that may be relevant to one or more issues in the litigation.

To illustrate in more detail, parties to litigation typically have to share relevant evidence with opposing counsel through the discovery process. In many cases, each party makes a reasonable search of their records based on some set of terms or keywords and produces the results of the search to the other party. Discovery thus typically involves the gathering of potentially relevant materials, much of it digital, and then reviewing such materials to determine what to be shared with opposite parties. Additionally, during the course of the litigation each party may continually review those documents produced by the opposing party to locate documents relevant to the case at hand. Litigation thus represents a microcosm of a more general problem raised by the high volume of electronic documents present in a variety of contexts. Namely, how can a large volume of electronic documents be understood, reviewed, or searched in order that documents relevant to a particular topic or user's interest may be located.

To aid users in resolving these problems, a document analysis system, may be provided in a given electronic context. A document analysis system is a computer system used to process a corpus of electronically stored information (referred to as the corpus) and allow users to analyze, review or navigate the information, or search the electronic information to return electronically stored information responsive to a search (also referred to as a query). Items of electronic information that form a corpus may be referred to interchangeably as (electronic) documents, items, files, objects, items, content, etc. and may include objects such as files of almost any type including documents for various editing applications, emails, workflows, etc.

In particular, emails are ubiquitous within almost all modern enterprises, serving as the almost de-facto form of communication in such enterprises. It is thus often required to obtain and review such emails in the course of a litigation or other type of document review. As such, a document analysis system may provide a mechanism by which users can be presented with these emails and review such emails and associated data. Emails, however, are a problematic subset of the documents analyzed by such a document analysis system as the nature of emails usually results in computationally intensive and slow analysis of such emails.

Specifically, in many cases it is desirable for document analysis systems to identify and present such emails in the form of "conversation trees", where each conversation tree represents a conversation comprised of a set of associated emails that include an original or root email, (the beginning of the conversation) and all of the subsequent replies and forwards transitively associated with that original email.

The determination of such email conversations from email data in the document analysis environments is often times complex. Email data may comprise email metadata, or actual emails document themselves, of a large volume of emails (e.g., on the order of hundreds of thousands or millions in some cases). Construction of the conversation trees thus requires the determination of associated emails and the original or root email of such a conversation tree from a large volume of email data. The processing of such email data may thus be computing time and resource intensive.

Complicating these determinations is the consideration that email data may be retrieved from different email servers (e.g., of different types) at different times. Thus, metadata for emails and the email documents may be obtained at different times. Moreover, the conversation trees determined at one point may be incomplete and new email data regarding such conversation trees may be obtained at (e.g., multiple) subsequent times. Accordingly, such document analysis systems may be required to frequently identify conversation trees pertaining to newly obtained email data and update the identified conversation trees. The incremental identification and update of such conversation trees may be even less performant (e.g., from a computing time and resource standpoint) than the original identification of such conversation trees.

Other factors also complicate the document analysis of emails in such document analysis systems. Namely, if such emails are obtained from multiple email servers for multiple user accounts of various users in an enterprise, there is likely to be a significant degree of duplicity of the emails between users. Duplicity may occur, for example, because the same email is sent to a number of recipients at once or because it is often the case that emails quote or include the text of previous emails (e.g., when responding or forwarding an email) and therefore may contain large amounts of duplicative content.

From a user's perspective it is desirable that such emails including duplicative content are identified by the document analysis system such that the user may review such duplicative content only once. In other words, if an inclusive email (e.g., and any included or subsumed emails) are identified to a user, the user may review all that content in the identified inclusive email and avoid having to review other emails identified as included in an inclusive email. The identification of such inclusive (or subsumed) emails is, however, not a trivial task, being quite computationally expensive, especially when such incremental updates to the email data as discussed above are taken into account.

It would thus be desirable to have improved systems and methods for document analysis of email data that can efficiently construct and incrementally update representations of email conversations.

To those ends, among others, attention is directed to embodiments of the document analysis systems disclosed herein. Embodiments of such document analysis systems may obtain email data on emails from source systems and organize and analyze such emails to allow users to review such email using the system. Such a document analysis system may be, for example, a multi-tenant platform that provides document analysis services to users from multiple (e.g., distinct) tenants, including allowing users of these tenants to access and review emails and email data associated with the tenant. For example, in a litigation context such a tenant may be a law firm or other organization reviewing emails associated with a third-party entity such as a party to litigation or a third-party entity subject to a subpoena.

To provide such capabilities, the document analysis system may include a conversation service that organizes emails into conversations so the document analysis system can display these emails in the context of an associated email conversation and allow users to view the conversations and review the emails in the context of these conversations. Specifically, the conversation service may obtain email data collected or obtained from email servers from one or more source systems (e.g., email servers in one or more locations). The conversation service builds a graph of the emails, where the nodes represent data about an email and the edges (connections) in the graph between the nodes of the graph are determined based on metadata associated with the emails or the text content of the emails. These email graphs may be efficiently updated as new email data is obtained such that the document analysis system may quickly organize emails into conversations for utilization by users in reviewing these emails in context.

Looking now at FIG. 1, a block diagram of one embodiment of a document analysis system employing hierarchical clustering of document portions is depicted. The document analysis system 101 is part of computing environment 100 including a database system 105, document analysis system 101, and one or more client computers 130.

In the depicted embodiment document analysis system 101 may include one or more (virtual or physical) servers or other type of computing device utilizing a central processing unit 112 connected to a memory and a data store 118 (e.g., via a bus). Central processing unit 112 may represent a single processor, multiple processors, a processor(s) with multiple processing cores and the like. Data store 118 may include a volatile or non-volatile non-transitory storage medium such as RAM, hard disk drives, flash memory devices, optical media, or the like. Document analysis system 101 may be connected to a data communications network such as the Internet, a local area network (LAN), a wide area network (WAN), a cellular network or some other network or combination of networks.

Data store 118 stores computer executable instructions 119. Computer executable instructions 119 can represent one or more multiple programs or operating system instructions. In one embodiment, instructions 119 are executable to provide document analysis application 122. Document analysis application 122 may be implemented on the same computing systems or can be distributed across multiple computing systems, platforms or physical or virtual server. The document analysis system 101 can be a multi-tenant document analysis system whereby the services provided by the document analysis system 101 may be accessed by users associated with different entities (e.g., enterprises, organizations, etc.) to perform those services on data associated with those entities. Again, it will be noted here that while embodiments described and depicted with respect to FIG. 1 include a deployment of a document analysis system on a physical computing device other embodiments may include the document analysis system deployed as a service on, for example, a cloud computing environment or otherwise deployed without loss of generality.

Client computer system 130 may include components similar to those of the server of document analysis system 101, such as CPU 138 and data store 140. Additionally, client computer system 130 may include executable instructions 132 to provide user interface 134 that allows a user to interact with document analysis system 101 to review the documents 107 of the corpus. These instructions 132 may have, for example, been provided by document analysis system 101 in response to an access by client computer 130. For example, user interface 134 may be provided through a web browser, file system interface or other method without loss of generality. Moreover, user interface 134 may interact (e.g., issue requests, receive responses, etc.) with a corresponding interface 136 of the document analysis application 122, which may be, for example a web services interface, an Application Programming Interface (API) or another type of interface.

Again, those skilled in the art will appreciate that document analysis system 101 shown in FIG. 1 is merely an example of a computing system and embodiments of a document analysis system that may be implemented using other computing systems (e.g., desktop computers, laptops, mobile computing devices, services platforms, cloud computing platforms or other computing devices or platforms with adequate processing and memory) including multiple computers acting together to provide a document analysis system (e.g., a cluster of servers or other computing devices connected by a network acting together to provide the document analysis system). Similarly, client computer 130 may include any suitable desktop computer, laptop, mobile device, server, or other computing system.

Database system 105 utilized by document analysis system 101 may comprise a file server or database system or other storage mechanism remotely or locally accessible by document analysis system 101 which, according to an embodiment, may be almost any SQL or NoSQL platform. Specifically, in one embodiment database system 105 may be, for example, a columnar data store such as H base, Bigtable, or that provided by Snowflake. Additionally, in some embodiments database system 105 may include database engine 109. Such a database engine 109 may be used for processing or otherwise manipulating or performing operations on data stored in database system 105 in a data local manner (e.g., performing operations close to the location of the data which is being operated on). In one embodiment, the database engine 109 may include multiple compute nodes or clusters that can perform parallel processing on data stored at the database system 105 based on requests or instructions received at database engine 109, where that data may be stored in internally optimized compressed columnar format in a cloud based storage infrastructure.

Thus, at some time interval, document analysis system 101 may obtain email data from one or more source systems and store the email data 107 at the database system 105. These source systems may, for example, be email servers, user's computers, or other sources within an enterprise environment 111, or another type of source system that may be external to an enterprise environment 111. This email data 107 may include for example, the email documents or email metadata associated with emails sent from or received by particular users or email addresses. In some embodiments, the email documents received in accordance with such email data 107 may be assigned an identifier and may be further evaluated, processed, parsed, etc. to separate the email document into a set of text segments or other data 121 that may individually be stored and accessible at the database system 105 in association with the email data 107 and the corresponding email document. In one embodiment, these text segments 121 may be parsed out from an email or separated based on a portion of the email in which the text appears, or whether the text is original or quoted text within an email document. Thus, a text segment 121 may represented headers or send dates of an email, a text segment 121 may represent (e.g., a normalized) subject, a text segment 121 may represent original text of an email, a text segment 121 may represent a text of a first level of quotation, a text segment 121 may represent a second level of quoted text in an email, etc.

As discussed, associated email data 107 may be obtained at different points in time, where this email data 107 may be different types of email data. For example, in a litigation context, email data may be produced for one or more users or email addresses at a first point in time and email data for other users or email addressed may be produced at a subsequent point in time. Additionally, even email data for the same user or email address may be produced at different times, for example, email metadata for emails of a user may be obtained from one source system at a first time while the actual emails (e.g., email documents) may be obtained from another (or the same) source system at a second subsequent point in time. Additionally, as has been discussed, document analysis system 101 may be a multi-tenant platform, thus the email data 107 obtained at a given point may be associated with a particular tenant of the document analysis system 101 and stored in association with that tenant at the database system 109. Accordingly, in one embodiment, the email data 107 obtained by the document analysis system 101 may include email data 107 obtained at different times for different tenants.

The document analysis application 122 may provide an interface and associated service through which users may review this email data 107 (e.g., email data associated with a tenant with which the user is associated). In many cases, such an interface may present an interface by which these emails may be accessed an reviewed in the form of "conversation trees", where each conversation tree represents a conversation comprised of a set of associated emails that include an original or root email, (the beginning of the conversation) and all of the subsequent replies and forwards transitively associated with that original email.

Referring briefly to FIG. 2, one embodiment of an interface that may be utilized by a document analysis system is presented. As can be seen here, the interface 200 may include a area where a conversation tree 202 comprising a graphical depictions of a related set of emails may be presented. The conversation tree 202 thus graphically depicts each of the emails of a conversation tree 202 that have been determined from email data and the relationships between them (e.g., which email is a root email, which emails are responsive to other emails, etc.). Additionally, the conversation tree 202 may graphically depict which emails are inclusive of other emails or are subsumed in other emails. The interface 200 may also include an area 204 where the email document associated with a selected email (e.g., as selected from the conversation tree 202) may be displayed (if available at the document analysis system) and an area 206 where metadata about the selected email may be displayed.

Returning to FIG. 1 now, in order to provide such capabilities, the document analysis system 101 may include a conversation service 124 that organizes emails into conversations so the document analysis system can display these emails in the context of an associated email conversation and allow users to view the conversations and review the emails in the context of these conversation. Specifically, the conversation service 124 may obtain email data 107 collected or obtained from the one or more source systems (e.g., email servers in one or more locations). The conversation service 124 builds a graph of the emails (an email graph), where the nodes of the graph represent emails and data about that email and the edges (connections) in the graph between the nodes of the graph are determined based on metadata associated with the emails or the textual content of the email.

Moreover, conversation service 124 may apply a weighting heuristic to determine weights associated with edges of the graph, or to identify relationships (e.g., reply relationships) between the emails. Using such a graph, conversations within the email graph may be determined by evaluating the graph to determine conversation trees within the graph. Each conversation tree within the graph representing an email conversation may comprise, for example, a disconnected portion of the graph comprising a set of nodes, including a root node, and a set of edges representing relationships between those nodes. The emails of the conversation represented by the conversation tree may then be evaluated to determine which of those emails are inclusive (or subsumed) and the nodes representing those inclusive (or subsumed) emails marked in the conversation tree.

In particular, in one embodiment, to increase efficiency, especially with respect to the presentation of the emails and related conversations in a user interface as discussed, the conversation service 124 may utilize an email graph comprising two email graphs, a raw graph 113 comprising nodes representing data on emails as determined from various different sources, and a simplified graph 115 derived from the raw graph 113. The raw graph 113 may also include edges representing relationships between the nodes, with equivalence edges or relationships relating equivalent nodes related to the same email and reply edges or relationships between two nodes, where one node of the two nodes joined by the reply relationship represents email data on a first email that is a reply to a second email represented by the second node joined by the relationship, where the second node represents email data on the second email. The presence of the emails and the reply relationships can be derived, for example, from the email documents or the metadata associated with such documents, such as the SMTP metadata or MAPI metadata. Such a raw graph 113 may thus include multiple nodes representing the same email and associated with different types of data which may be obtained from different sources (or from the same source). There may also be a weighting on reply edges denoting, for example, a sum of the signals representing a likelihood of that reply relationship.

Thus, it will also be noted that because the evaluation of email data to determine reply relationships may be based on various heuristics and there may be a weighting assigned to each reply relationship, in many cases there may be multiple reply relationships in the raw graph associated with a single node, each with an associated weighting. In other words, the raw graph may denote that a particular email (represented by a node) may be a reply to multiple different emails (e.g., represented by distinct nodes), with the weighting on each reply relationships denoting a likelihood or sum of signals for that reply relationship.

Figure 3B:
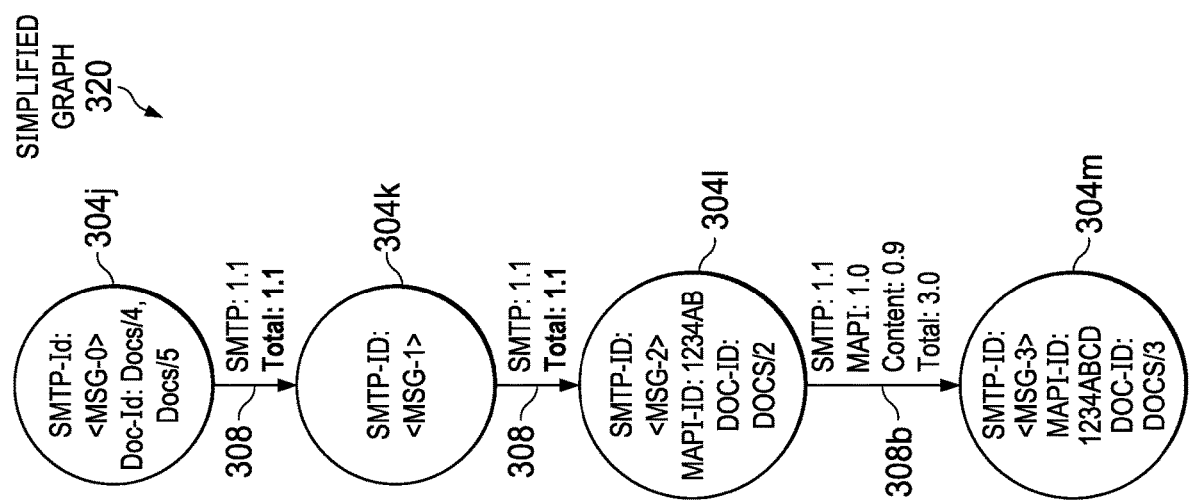
FIGS. 3A and 3B are a block diagram of example email graphs.
Figure 3A:
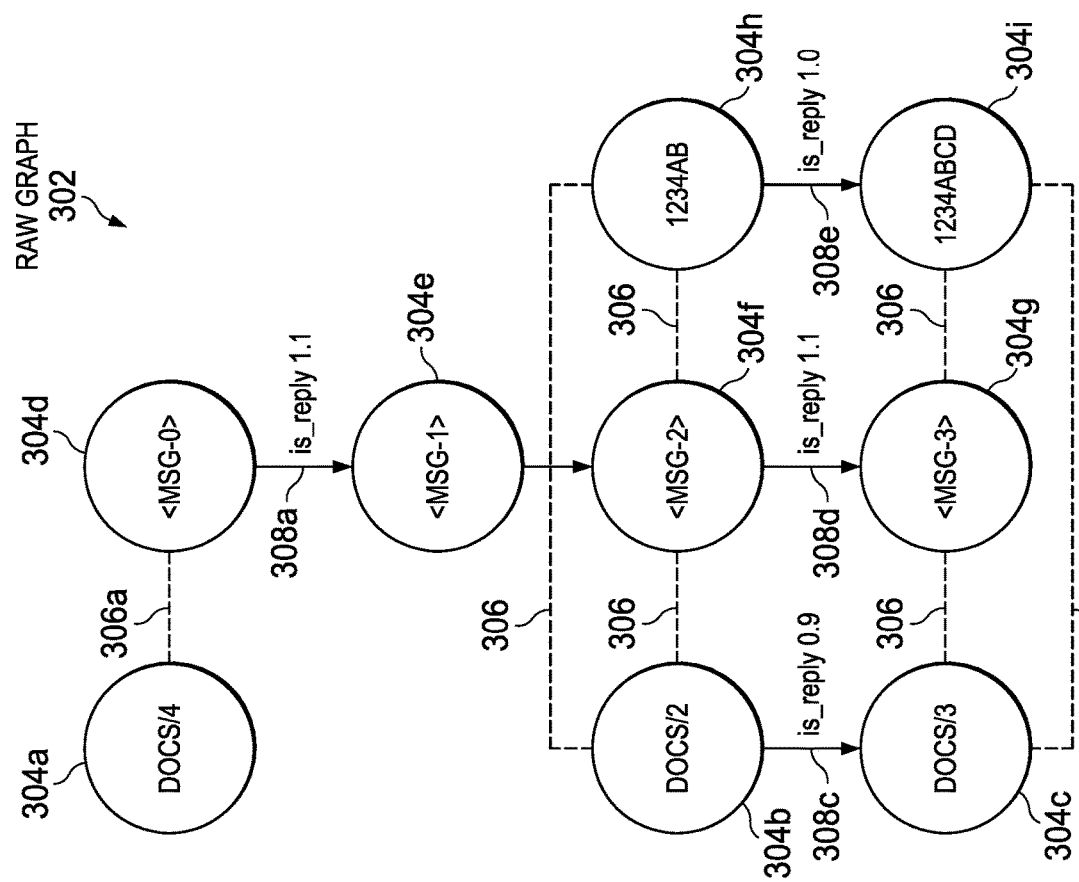

It may be helpful here to give an example of a portion of a raw graph such that the nodes and edges comprising raw graph 113 may be better understood. FIG. 3A depicts just such an example of a portion of a raw graph. Here, the raw graph 302 may include a set of email nodes 304 representing data of an email. Thus nodes 304 may represent a piece of metadata about an email or may represent an email document of an email. Thus, for example, nodes, 304a, 304b and 304c may be associated with document identifiers (e.g., "Docs/4, "Docs/2" and "Docs/3") where those document identifiers may be identifiers of documents (e.g., the actual sent email, attachments, etc.) for an email that are stored at the document analysis system (e.g., "Doc/4" may be an identifier of an email document for an email. Nodes 304d, 304e, 304f, 304g, 304h and 304i may be associated with identifiers for an email as obtained from email metadata obtained from a source system.

As an example, nodes 304d, 304e, 304f, 304g may each represent emails determined from Simple Mail Transfer Protocol (SMTP) metadata and represent those emails with identifiers determined from this email metadata (e.g., "<MSG-0>"), while nodes 304h and 304i may each represent emails determined from Messaging Application Programming Interface (MAPI) metadata and represent those emails with identifiers determined from this email metadata (e.g., "1234AB").

As has been noted, emails determined from different sources may in actuality be the same email. This may occur, for example, when the same email is independently identified by the conversation service in multiple sources and represented by an equivalent node with the identifier for that email associated with each source. The nodes 304 representing emails determined from various sources may thus have equivalence relationships 306 amongst themselves denoting that the email represented by the related nodes is the same email. For example, equivalence relationship 306a between node 304a and 304d may represent that the email that included the document identified in the document analysis system by the identifier "Doc/4" and represented by node 304a is the same email as the email (e.g., independently) identified by "<MSG-0>" in SMTP email metadata and represented by node 304d. Note here that, in some cases, emails may only be identified from certain sources, or at certain points, data identifying particular emails may have only been received from certain source system. Thus, for example, a node 304e may represent an email that has been determined to exist using SMTP metadata and is identified my "<MSG-1>", but that no corresponding document for that email has been identified or received and that email has not been identified in data from any other source system (e.g., no other metadata on that email has been identified).

The raw graph 302 may also include reply relationships 308 between nodes 304 denoting that an email represented by a node 304 is a reply to another email represented by the other node 304 joined by the relationship 308. These reply relationships may be directional such that they indicate which of the related nodes represents the email that is the reply and which of the related nodes represents the email that was replied to. For example, relationship 308a may denote that the email represented by node 304d (e.g., identified by "<MSG-0>" in SMTP metadata) is a reply to an email represented by node 304e (e.g., identified by "<MSG-a>" in SMTP metadata). Each reply relationship 308 may also have an associated weight determined by a weighting heuristic, where the weight is numerical representation of the strength of the relationship (e.g., an indication of how likely the reply relationship between the emails represented by the nodes is).

It will be noted here that, in some cases, reply relationships 308 in the raw graph 302 may only be between nodes 304 derived from the same source (or type of source) or representing the same type of data. This may be the case, for example, because these reply relationships may be derived or determined based on the data derived from the source system. Thus, reply relationships 308 may only be, for example, between nodes 304 that represent emails as determined from email documents (e.g., nodes 304a, 304b, 304c), between nodes 304 that represent emails as determined from SMTP metadata (e.g. nodes 304d, 304e, 304f, 304g), or between nodes 304 that represent emails as determined from MAPI metadata (e.g. nodes 304h, 304i). In certain embodiments then, the weighting heuristic utilized in determining a weight for a reply relationship 308 may be based on the source system (or data determined therefrom) from which the related nodes 304 were derived. The weighting heuristic may be, for example, a numerical representation of the signals derived from a source system that were evaluated to determine such a reply relationship 308 should exist.

Referring back to FIG. 1, because of the details which the raw graph 113 represents, such a raw graph 113 may prove difficult or inefficient to navigate when manipulating or evaluating such email data for use in providing email analysis or presenting such email data in a user interface (e.g., when real-time or near real-time processing may be desired). For instance, it may be desired to give priority to the nodes of the email graph that are associated with email documents when traversing an email graph in order to facility presentation of those documents to a user in an interface of the document analysis system 101. Because of the nature of graphs, among other reasons, it may be difficult to give preference to the email document nodes when traversing raw graph 113.

As such, in order to be able to give priority to nodes of an email graph that are associated with documents of an email when traversing an email graph embodiments of the conversation service 124 may also create and utilize a simplified graph 115 derived from the raw graph 113. The simplified graph 115 includes nodes representing distinct emails and reply relationships between these notes. Specifically, in certain embodiments, the simplified graph 115 may include email nodes that represent equivalent nodes of the raw graph 113 (e.g., nodes of the raw graph which have equivalency relationships between them) collapsed into a single node and reply relationships edges between the email nodes. For the simplified graph 115, the reply edges of the raw graph 113 may also be collapsed and can then be pruned based on the weighting associated with the resulting reply edge such that each email node of the simplified graph 115 has at most one incoming reply edge (e.g., an email can be a reply to only one other email).

Again it may be helpful here to give an example of a portion of a simplified graph such that the nodes and edges comprising simple graph 115 may be better understood. FIG. 3B depicts an example of a simplified graph corresponding to the example raw graph of FIG. 3A. Here email nodes 304 (e.g., 304j, 304k, 304l, 304m) represent emails. These email nodes 304 are determined based on email nodes in the corresponding raw graph 302 that represent the same email as determined from the equivalency relationships 306 of the raw graph 302. In particular, each email node 304 of the simplified graph 320 is a single node representing the email and associated with all the data of every equivalent node 304 in the raw graph 302. For example, node 304l of the simplified graph 320 may represent the email represented by nodes 304b, 304f and 304h in the corresponding raw graph 302 and be associated with all the identifiers for that email as determined from those collapsed nodes (e.g., "Docs/2", <MSG-2>" and "1234AB").

Similarly, each reply relationship 308 of the simplified graph 320 between two nodes 304 may represent that an email represented by a node 304 is a reply to another email represented by the other node 304 joined by the relationship 308. These reply relationships may be directional such that they indicate which of the related nodes 304 represents the email that is the reply and which of the related nodes represents the email that was replied to. For example, relationship 308b may denote that the email represented by node 304l is a reply to an email represented by node 304m. Node 304m however, may have no outgoing reply relationships. In other words, the email represented by node 304m may not be a reply to any other email, thus the email represented by node 304m may be considered the initiator mail and node 304m may be considered the "root" of the conversation tree. These reply relationships 308 between nodes 304 in the simplified graph 320 may be determined based on corresponding reply relationships 308 of the raw graph 302 between equivalent nodes 304 of the raw graph 302 representing the same emails. Specifically, reply relationships between equivalent nodes 304 in the raw graph 302 may be collapsed into a single reply relationship 308 in the simple graph 320 having a weight determined based on the collapsed reply relationships of the raw graph 302.

To illustrate by way of example, here node 304l in the simplified graph 320 may represent an email represented by each of equivalent nodes 304b, 304f and 304h in the raw graph 302, while node 304m in the simplified graph 320 may represent an email represented by each of equivalent nodes 304c, 304g and 304i of the raw graph 302. Relationship 308c exists between nodes 304f and 304g and has a weight of 0.9, relationship 308d exists between nodes 304b and 304c and has a weight of 1.1 and relationship 308e exists between nodes 304h and 304i and has a weight of 1.0. Relationship 308b between nodes 304l and 304m in the simplified graph 320 may thus be determined by collapsing relationships 308c, 308d and 308e of the raw graph 302 into a single relationship having a weight of 3.0 (e.g., the sum of the individual weights of the collapsed relationships 308c, 308d and 308e).

It will be noted that in the simplified graph 320 it may be desired that each email node 304 of the simplified graph 115 has at most one incoming reply edge (e.g., an email can be a reply to only one other email). Thus, if there are multiple possible incoming reply relationships to a node 304 as determined from the raw graph 302, the reply relationship 308 with the highest weight (e.g., as determined from combined weights of the corresponding collapsed relationships in the raw graph) may be selected and included in the simplified graph 320 while other determined possible reply relationships for the node may be pruned (e.g., not represented in the simplified graph).

Returning to FIG. 1, the conversation service 124 can thus determine and present conversations by evaluating the simplified graph 115 to determine conversation trees within the simplified graph 115. This evaluation may be done, for example, by traversing the simplified graph 115 for trees using, a depth first search or other traversal mechanism. Each conversation tree within the simplified graph representing an email conversation may comprise, for example, a disconnected subgraph of the simplified graph comprising a set of nodes, including a root (or "initiator") node, and a set of edges representing relationships between those nodes. The simplified graph 115 may therefore include a set of subgraphs where each subgraph is a conversation tree representing an email conversation. For instance, the simplified graph 320 depicted in FIG. 3B is an example conversation tree that may be a subgraph (portion of) a larger simplified graph.

Conversation service 124 may evaluate the emails of the conversation represented by the conversation tree to determine which of those emails are inclusive (or subsumed) and the nodes representing those inclusive (or subsumed) emails marked in the conversation tree of the simplified graph. As the simplified graph 115 comprises all the email data (or reference to such data) of a single email (e.g., the reference to the email document, the email metadata, etc.) in a single node, this simplified graph may now be efficiently traversed and used to provide efficient document analysis and review for email conversations to a user of the document analysis system. Specifically, it may be easier to give preference to, or determine when, an email document for an email has been obtained and give priority to such email documents during traversal.

As discussed, however, in many scenarios email data may be retrieved or obtained from different source systems (e.g., email servers, which may be of different types) at different times. Thus, the conversation trees of the simplified graph 115 determined at a particular point may be incomplete (e.g., all the email data about such conversations may not yet have been obtained from source systems having such data) and new email data regarding such conversation trees may be obtained at (e.g., multiple) subsequent times. Accordingly, such document analysis system 101 may be required to frequently update the simplified graph 155. Specifically, it may be desired to adapt embodiments to identify conversation trees pertaining to newly obtained email data and update the identified conversation trees in the simplified graph 115 (and, additionally, the raw graph 113).

However, because the simplified graph 115 may collapse or eliminate some of the data of the raw graph 113 (e.g., weak reply relationships, email nodes, etc.) a problem may now occur in which the simplified graph does not contain enough data to facilitate the efficient incremental update of the simplified graph 115 when such new email data is obtained. To understand such issues, along with the embodiments of incrementally updating such raw graphs and simplified graphs, one embodiment of a table structure that may be utilized in a columnar data store is depicted in FIG. 4.

Embodiments of such a table structure may be a functionally recursive manner of encoding a graph structure that matches well with the capabilities of a columnar data store, including, for example, common table expressions or recursive common table expressions. In this example, the matter identifier (e.g., the "matter_uuid") may correspond to an identifier associated with a tenant of the document analysis system, while the "conv_id" may correspond to an identifier for a conversation within a graph (e.g., an identified conversation tree). An instance (e.g., column or row) of a "final_graph" table may correspond to an email node while an instance (e.g., column or row) of a "edges" may correspond to a reply relationship.

Moving back to FIG. 1, accordingly, in certain embodiments, when new email data is received at the document analysis system 101 and incremental update of the email graph of the document analysis system 101 may be performed, whereby an incremental graph may be determined and this incremental graph utilized to update the email graph. In some embodiments, conversation service 124 may utilize the raw graph 113 to perform an incremental update to the simplified graph 115. These incremental updates may service to apply pinpoint edits to update only the portions (e.g., conversations) of the raw graph 113 and simplified graph 115 that need to be updated based on the new data without having to rebuild, reevaluate or traverse the entirety of the raw graph 113 or the simplified graph 125.

In certain embodiments then, the conversation service 124 may determine the incremental updates to the raw graph 113 and the simplified graph 115 based on the new mail data and utilize the database system 105 (including the database engine 109) to preform incremental updated to the raw graph 113 and the simplified graph 115 in an efficient manner that may be data local (e.g., performed as close to the data in the database system 105 as possible, such as in database engine 109), distributed (e.g., using the parallel processing capabilities of database system 105 for instance) and cross-tenant (e.g., in a manner that can be utilized to preform incremental updates to data across tenant data in the raw graph 113 and simplified graph 115 when possible. To illustrate, as the raw graph 113 and simplified graph 115 may represent the email data 107 of multiple tenants of the document analysis system the overhead to process or update raw graph 113 or simplified graph 115 for multiple tenants may be shared when processing data for those graphs across all tenants.

According to embodiments, then, the newly obtained email data may be loaded or otherwise accessed. New nodes or edges to add can then be determined as part of building an incremental graph comprising an incremental raw graph 123 and a corresponding incremental simplified graph 125. The emails of the incremental simplified graph 125 can then be evaluated to determine which of the emails of the simplified graph are inclusive (or subsumed) and those emails (e.g., the nodes representing those emails) may be annotated or flagged (e.g., with identifiers of emails or nodes which are included or inclusive accordingly, etc.). This incremental simplified graph 125 can then be used by conversation service 124 (e.g., in the presentation of an interface displaying an email conversation or otherwise). Additionally, the incremental raw graph 123 can be used to updated or replace the corresponding portions (e.g., conversations) in the raw graph 123 and the incremental simplified graph 125 can be used to updated or replace the corresponding portions (e.g., conversations) in the simplified graph 115.

Thus, first an incremental raw graph 123 may be determined from newly received email data. Such an incremental raw graph 123 may be determined utilizing instructions sent from the conversation service 124 to the database engine 109 and may be maintained or stored in tables at the database system 105 (e.g., for example, in memory of the database engine 109). Specifically, one or more nodes may be determined to add to the incremental raw graph 123 based on the identification of a new email from email data 107 (e.g., either obtained new email metadata or an obtained new email document). Alternatively, a node to add may represent newly identified email data (e.g., an email document or email metadata) pertaining to an email already represented by one or more nodes of the existing raw graph 113. These new nodes to add to the incremental raw graph may then be added to the incremental raw graph 113.

New edges to add to the raw graph 113 may be determined and added to the incremental raw graph 123 based on the email data associated with (e.g., each of) the newly determined node. These new edges may include new equivalency edges representing other existing nodes in the raw graph 113 that represent email data for the same email or a reply relationship edge between the new node and a second node of the raw graph 113 representing another email. Specifically, the newly determined equivalency edges or reply relationships may be determined based on email metadata received as part of the new email data 107. Such equivalencies between emails and reply relationships between emails may be specified in such email metadata and may be determined and added to the incremental raw graph 113 along with any nodes of the raw graph 113 related to the new node by the added relationship.

Edges to add to the incremental raw graph 123 may also be determined from the content of the email documents themselves. To determine such content edges, for the newly added email node of the incremental raw graph 113, all content edge candidates can be determined. These content edge candidates may be determined by paring the email represented by the newly added node to all emails (e.g., in the email data 107 associated with the same tenant, etc.) that share a (e.g., similar) subject line and compatible send dates in the new email data 107. Existing (e.g., previously received) emails may also be included (e.g., if they share a subject with the email represented by the newly added node). Here, for example, if a normalized subject of one email matches up to another email and an extracted send date for a text segment of one of the emails for the body of that email matches a second send date for a text segment 121 of from a quoted portion of another email a candidate content edge between the two emails may be created in the candidate content edge table.

These content edge candidates (e.g., pairs of email which are candidates to having their representative nodes linked by a reply relationship) can thus be stored in a table (e.g., at the database engine 109). The content edge candidate table may then be joined with the table of text segments 121 extracted for each of the emails of each of the emails referenced in the content edge candidate table. By joining the tables in this manner if comparison of the text segments is needed this comparison may be done in an efficient manner.

A similarity metric for each of the content edge candidates can then be determined. Specifically, the text segments of each pair of emails for the candidate content edge can then be compared. In one embodiment for each pair, a text segment 121 for the body (or a deeper level of quotation) of one email associated with candidate content edge may be compared to a second text segment 121 for a first (or deeper level) level of quotation of the other email associated with candidate content edge. This comparison may be done in both directions for the emails of the candidate content edge. In other words, the similarity metric can assess the similarity between text of one email for the candidate content edge and quoted text in the other email to determine if one of the emails associated with the candidate content edge has been quoted in the other email of the content edge. This comparison can be done using a Levenshtein distance metric (e.g., the levenshtein_ratio function). This similarity metric can then be stored for that candidate content edge in the content edge table. This similarity metric can be used to select a best candidate content edge for a new node based on the similarity metric (e.g., based on the highest determined similarity). Such a selection can be determined, for example, by a windowing function or the like. The selected candidate content edge (and the corresponding similarity metric) can be inserted into the incremental raw graph 123 (with the similarity metric value being assigned as the weight to the inserted content edge). The incremental raw graph 123 thus includes the new node and any determined equivalence edges or relationship edge along with the other nodes related to the new node by the determined edges.

The remainder of the incremental raw graph 123 may then be determined and the simplified graph 125 determined from the incremental raw graph 123. Specifically, each of the edges of the incremental raw graph 123 can then be followed recursively using the raw graph 113, and each node and relationship transitively connected to an of the edge in the incremental raw graph 123 in the raw graph 113 may be added to the incremental raw graph 123. This recursive addition may serve to add adjacent edges and equivalent edges from the raw graph 113 recursively. Here, each edge in the incremental raw graph 123 can be accessed in the raw graph 113 and followed to the next node, this node can then be added to the incremental raw graph 123, and each edge of that new node recursively added to the incremental raw graph 123. Thus, if an accessed node in the raw graph 113 is a root node or a leaf node it will be added to the incremental raw graph 123 and no further edges may exist in the raw graph 113 to follow. Thus, at this point the incremental raw graph 123 may include each newly determined node from the newly received email data 107. Moreover, for each newly determined node, the incremental raw graph 123 may include all nodes that of the raw graph 113 that are related (directly or indirectly) to the new node (e.g., based on the initial determined edges for that new node as determined through, for example, a textual comparison of emails or through email metadata).

Once the incremental raw graph 123 is determined it can be transformed into incremental simplified graph 125 by collapsing the equivalent nodes of the incremental raw graph 123 to get a single node in incremental simplified graph 125 representing all equivalent nodes in the incremental raw graph 123. This can be done, for example, using a COALESCE function or the like. Additionally, a best reply relationship edge may be selected for the simplified graph 125 between any two nodes based on the sum of the weights of all the reply relationship edges between all equivalent nodes for those two nodes (e.g., the nodes collapsed to form those two nodes) in the incremental raw graph 123. The weights associated with the reply edges of the incremental raw graph 123 can be used to select the best reply edges based on the similarity metric (e.g., based on the highest determined similarity) associated with each edge. Such a selection can be determined, for example, by a windowing function or the like. The determined best reply relationship edges are then added to the incremental simplified graph 125.

This incremental simplified graph 125 can then be traversed to determine conversations within the incremental simplified graph and assign identifiers to all the nodes of each conversation tree within the incremental simplified graph 125. Specifically, the incremental simplified graph 125 can be obtained and recursively traversed from the root node of each conversation tree in the simplified graph 125 to the leaves of each conversation tree. Thus, such a traversal may determine each node of the incremental simplified graph that is a root node (e.g., a node that has no reply relationship edges specifying that node as a reply and representing an originator email) for a conversation tree and beginning with each of those nodes traverse the associated conversation tree originating with the node. This traversal may serve to assign a conversation identifier to the conversation represented by the conversation tree associated with each root node and, in some embodiments, may impose a size limit to the conversations. Such a traversal may, in one embodiment, be done by a recursive common table expression (CTE) from the root nodes down to the leaves of a conversation tree in order to efficiently implement such a traversal.

Starting with the root node of the conversation tree then, each child node of the root node may be determined. Each of the child nodes can then be updated with the conversation identifier in the incremental simplified graph 125. In one embodiment, a conversation identifier may be, for example, an identifier of the root node (e.g., representing an originator email) of the conversation tree, such that the identifier for the root node is propagated to each of the nodes of that conversation tree subgraph during traversal.

Additionally, in one embodiment a node level of the traversal may be tracked and incremented. Such a node level may be added to the node (e.g., as an attribute or property of the node) in the incremental simplified graph 125. For each of the child nodes it can be determined if that child node is a leaf node. If the node is a leaf node, it can be determined if there are any more nodes in the node list. If there are no more nodes in the node list the recursive traversal may terminate, while if there are more nodes in the node list, the remaining nodes in the node list may be recursively traversed. If the node is not a leaf node all the child nodes of that node may be added to a list of nodes, and any remaining nodes in the node list recursively traversed. In one embodiment, the number of nodes in the current conversation tree may be tracked (e.g., by grouping the rows of a table comprising the incremental simplified graph 125) to determine if the number of nodes in the conversation tree exceeds some conversation size limit (e.g., 1000 nodes) and if the conversation size limit has been exceeded the traversal may stop.

Once the traversal of the conversation trees of the incremental simplified graph is terminated, the updated incremental simplified graph 125 may be determined and output. This incremental traversed simplified graph 125 can then be evaluated to detect inclusive emails. Emails that have content that is fully duplicated by other emails later in their thread are called subsumed. All other emails may be termed called inclusive. Knowledge of which emails are inclusive may help users of the document analysis system 101 work efficiently by ignoring subsumed emails and only looking at those that are inclusive.

Thus, the traversed incremental simplified graph 125 can then be used to detect inclusive or subsumed emails in embodiments. Once the traversed incremental simplified graph 125 is obtained, it can be traversed from the leaf nodes to the root node of the conversation tree. Specifically, for a conversation tree in the incremental simplified graph 125 each of the branches of the conversation tree may be identified (e.g., where a node of the conversation tree may be associated with one or more branches). Starting at a leaf node of the conversation tree, that branch may be followed upward until the root node of the conversation tree is reached, identifying each node of that branch with a branch identifier (e.g., which may be a node identifier of the leaf node which is the termination of that branch). Again, such a traversal may be accomplished with a recursive common table expression. Accordingly, each of the branches (e.g., comprising a set of nodes and relationships of a path through the conversation tree between a leaf node of the conversation tree and the root node of the conversation tree) of the conversation tree may be identified and placed in a branch table.

The text of the emails of each identified branch of the conversation tree can then be analyzed to determine if the text of any email represented by a node of the branch is duplicated in any descendant of the branch. Based on this determination, the nodes of the branch may be annotated indicated if the email represented by the node is inclusive or subsumed. To accomplish this, the branch table with the branches for the conversation tree may be joined with the text segments 121 to facilitate comparison. Each node of a branch can then be paired with all of its descendants. For example, a self-join leveraging the branch identifier for the branch and a node level for each node (e.g., as identified during a previous traversal as discussed) each node may be paired with all of its descendants. The emails associated with each of the paired nodes (e.g., a node and its descendants) can then be checked by comparing the text segments associated with each of the emails associated with those nodes to determine if the text of the email represented by one of the nodes is duplicated in any of the descendant nodes. If the text is duplicated the node representing the email which includes the duplicated content may be indicated (e.g., flagged or otherwise annotated) as inclusive.

This annotated traversed incremental simplified graph can then be output for use in presenting an interface corresponding to any of the conversations trees represented in the incremental simplified graph 125. Moreover, the incremental raw graph 123 and the incremental simplified graph 125 may then be used to update the raw graph 113 and simplified graph 115 respectively such that both the raw graph 113 and the simplified graph 115 may be incrementally updated based on newly received email data. Specifically, the subgraphs of the incremental raw graph 113 and the annotated conversation trees of the incremental simplified graph 125 may be substituted for the corresponding subgraphs and conversation trees in the raw graph 113 and the simplified graph 115, respectively.

In this manner, then, the document analysis system (and thus users of such a document analysis system) may quickly obtain, analyze, or otherwise utilize, new email data, without the need to reconstruct or traverse the entirety of data structures (e.g., graphs) representing the entirety of the email data obtained from source systems. Instead, such data structures may be efficiently and incrementally updated utilizing incremental data structures representing only portions of the data structures that will need to be altered based on the newly obtained data.

Moreover, through the use of the encoding of the data structures utilized by embodiments and the data stores or engines used to store and manipulate such data structures, embodiments may provide the advantages that the processing of email data and the manipulation of the representations of email conversations may be efficiently implemented in a distributed or data-local manner using a database engine that may be part of a database platform such as a database as a service. Additionally, in instances where the document analysis system is a multi-tenant platform, the processing may be accomplished as single (or fewer) job executions that can be more efficiently processed for multiple tenants.

Figure 5:
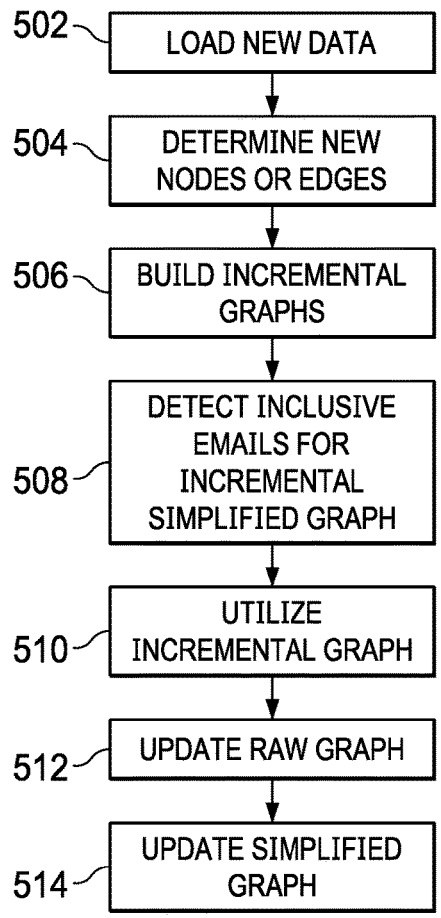
FIG. 5 is a flow diagram of one embodiment of a method for incremental update of a email graph.

Moving on to FIG. 5, one embodiment of a method for the incremental update of email graphs that may be employed by a document analysis system is depicted. Newly obtained email data may be loaded or otherwise obtained (e.g., accessed or received) (STEP 502). New nodes or edges to add can then be determined (STEP 504) as part of building an incremental raw graph and a corresponding incremental simplified graph (STEP 506). The emails of the incremental simplified graph can then be evaluated to determine which of the emails of the simplified graph are inclusive (or subsumed) and those emails (e.g., the nodes representing those emails) may be flagged or otherwise annotated (e.g., with identifiers of emails or nodes which are included or inclusive accordingly, etc.) (STEP 508). This incremental simplified graph can then be used in the presentation of an interface displaying an email conversation or otherwise (STEP 510). Additionally, the incremental raw graph can be used to updated or replace the corresponding portions (e.g., conversations) in the raw graph (STEP 512) and the incremental simplified graph can be used to updated or replace the corresponding portions (e.g., conversations) in the simplified graph (STEP 514).

Figure 6:
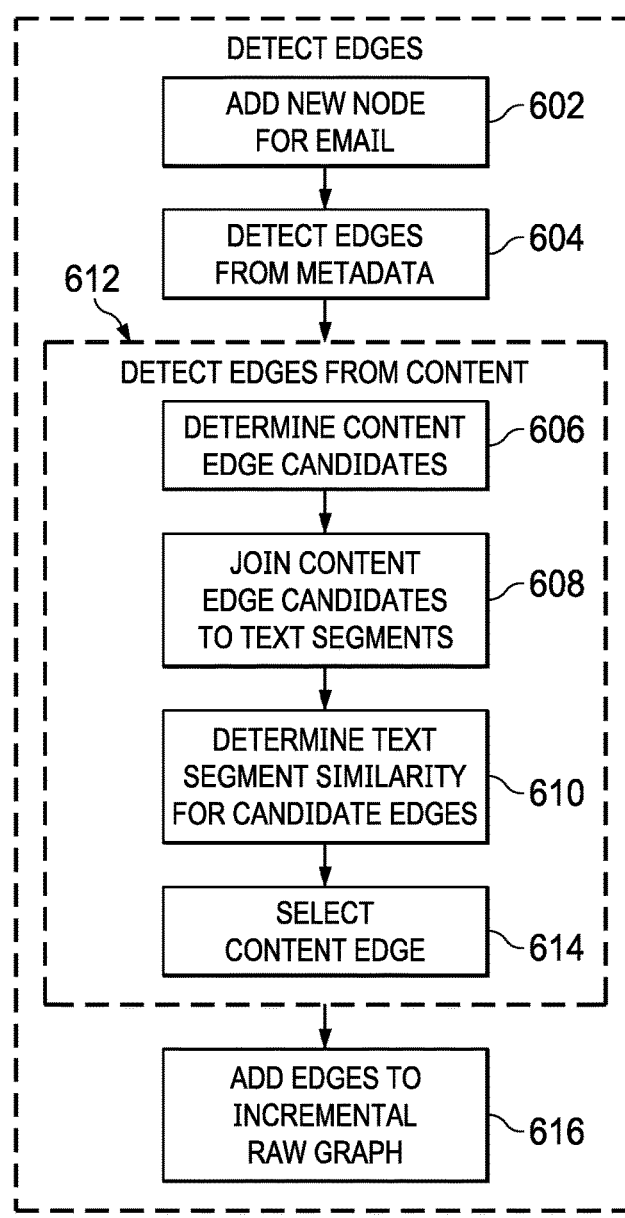
FIG. 6 is a flow diagram of one embodiment of a method for detecting edges for an incremental raw graph.

Initially, then, once new email data is obtained from one or more source systems an incremental raw graph may be determined. Turning to FIG. 6, one embodiment of a method for deterring content edges to add to the incremental raw graph is depicted. As a first step, one or more nodes may be determined to add to the incremental raw graph (STEP 602). This new node to add may be based on the identification of a new email from email data (e.g., either obtained new email metadata or an obtained new email document). Alternatively, a new node to add may represent newly identified email data (e.g., an email document or email metadata) pertaining to an email already represented by one or more nodes of the existing raw graph. These new nodes to add to the incremental raw graph may then be added to the incremental raw graph.

New edges to add to the raw graph may be determined and added to the incremental raw graph based on the email data associated with (e.g., each of) the newly determined node. These new edges may include new equivalency edges representing other existing nodes in the raw graph that represent email data for the same email or a reply relationship edge between the new node and a second node of the raw graph representing another email. The newly determined equivalency edges or reply relationships may be determined based on email metadata received as part of the new email data (STEP 604). Such equivalencies between emails and reply relationships between emails may be specified in such email metadata and may be determined and added to the incremental raw graph along with any nodes of the raw graph related to the new node by the added relationship.

Edges to add to the incremental raw graph may also be determined from the content of the email documents themselves (STEP 612). To determine such content edges, for the newly added email node of the incremental raw graph, all content edge candidates can be determined (STEP 606). These content edge candidates may be determined by paring the email represented by the newly added node to all emails (e.g., in the email data associated with the same tenant, etc.) that share a (e.g., similar) subject line and compatible send dates in the new email data. Existing (e.g., previously received) emails may also be included (e.g., if they share a subject with the email represented by the newly added node). Here, for example, if a normalized subject of one email matches up to another email and an extracted send date for a text segment of one of the emails for the body of that email matches a second send date for a text segment of from a quoted portion of another email a candidate content edge between the two emails may be created in the candidate content edge table.

These content edge candidates (e.g., pairs of email which are candidates to having their representative nodes linked by a reply relationship) can thus be stored in a table. The content edge candidate table may then be joined with the table of text segments extracted for each of the emails of each of the emails referenced in the content edge candidate table (STEP 608). By joining the tables in this manner if comparison of the text segments is needed this comparison may be done in an efficient manner.

A similarity metric for each of the content edge candidates can then be determined (STEP 610). Specifically, the text segments of each pair of emails for the candidate content edge can then be compared. In one embodiment for each pair, a text segment for the body (or a deeper level of quotation) of one email associated with candidate content edge may be compared to a second text segment for a first (or deeper level) level of quotation of the other email associated with candidate content edge. This comparison may be done in both directions for the emails of the candidate content edge. In other words, the similarity metric can assess the similarity between text of one email for the candidate content edge and quoted text in the other email to determine if one of the emails associated with the candidate content edge has been quoted in the other email of the content edge. This comparison can be done, for example, using a Levenshtein distance metric (e.g., the levenshtein_ratio function). This similarity metric can then be stored for that candidate content edge in the content edge table.

This similarity metric can be used to select candidate content edges (e.g., including a best candidate content edge) for a new node based on the similarity metric (e.g., based on the highest determined similarity) (STEP 614). Such a selection can be determined, for example, by a windowing function or the like based on, for example, if the similarity metric is over some threshold value (e.g., 90% or the like). The selected candidate content edge (and the corresponding similarity metric) can be inserted into the incremental raw graph (with the similarity metric value being assigned as the weight to the inserted content edge) (STEP 616). The incremental raw graph thus includes the new node and any determined equivalence edges or relationship edge along with the other nodes related to the new node by the determined edges.

Figure 7:
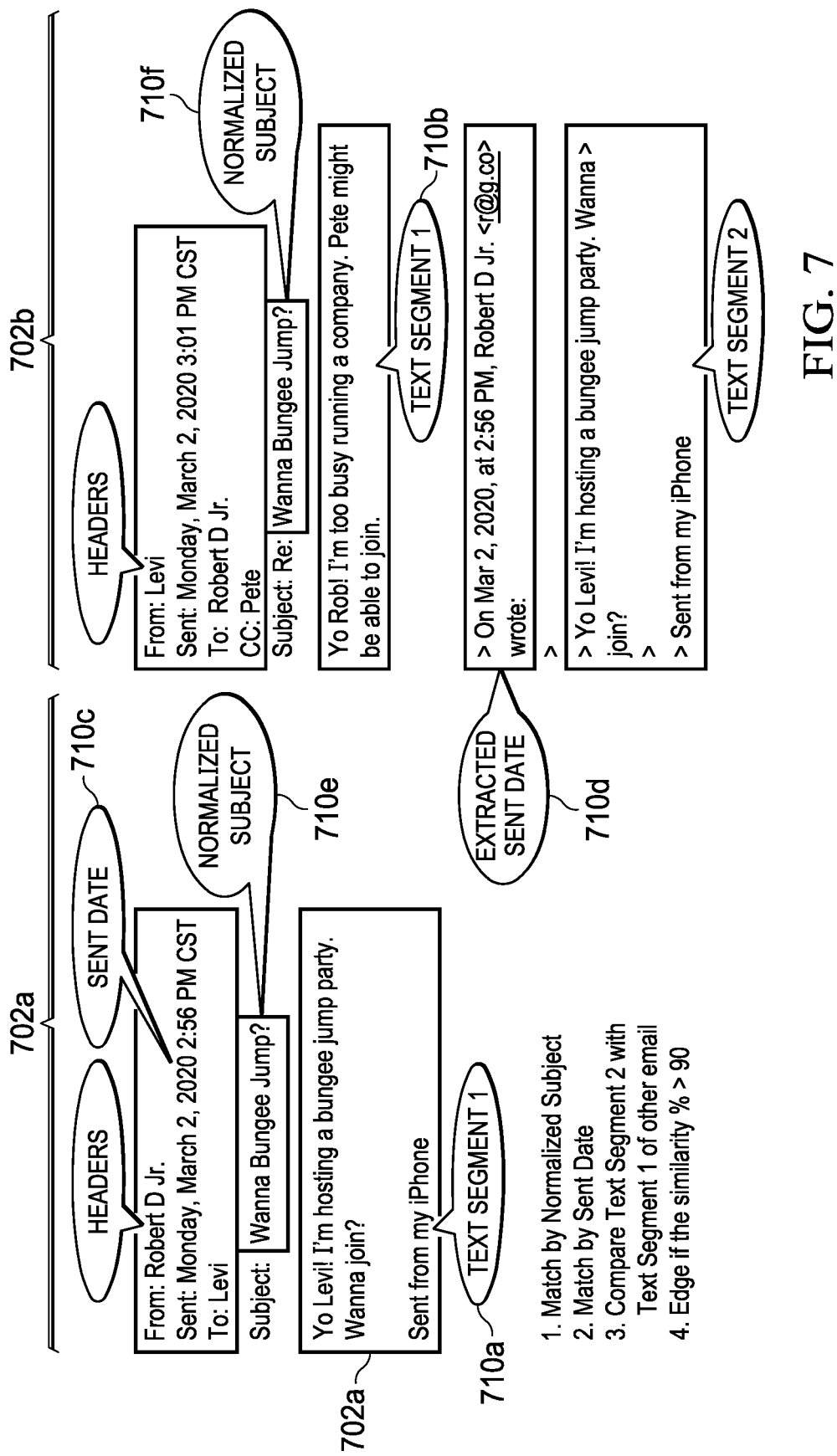
FIG. 7 is an example of the detection of a reply edge in an email graph.

It may be useful here to briefly illustrate visually such a comparison of text segments. FIG. 7 depicts a first email 702a and a second email 702b, along with text segments 710 (e.g., including for example, headers, normalized subjects etc.) that may be extracted from these emails. Notice that text segment 1 710a may be the body of the first email, while text segment 2 710b may be a first level quoted portion of second email 702b. Thus, by comparing the subject 710e of first email 702a with the subject 710f of the second email 702b, the send date 710c of first email 702a with the extracted send date 710d of the second email 702b associated with the first level quoted portions of the second email 702b, and text segment 1 710a with text segment 710b of a first level quoted portion of second email 702b as detailed in the enumerated steps 1-4 of the embodiment depicted it can be determined if a content edge should be added to an incremental raw graph.

Figure 8:
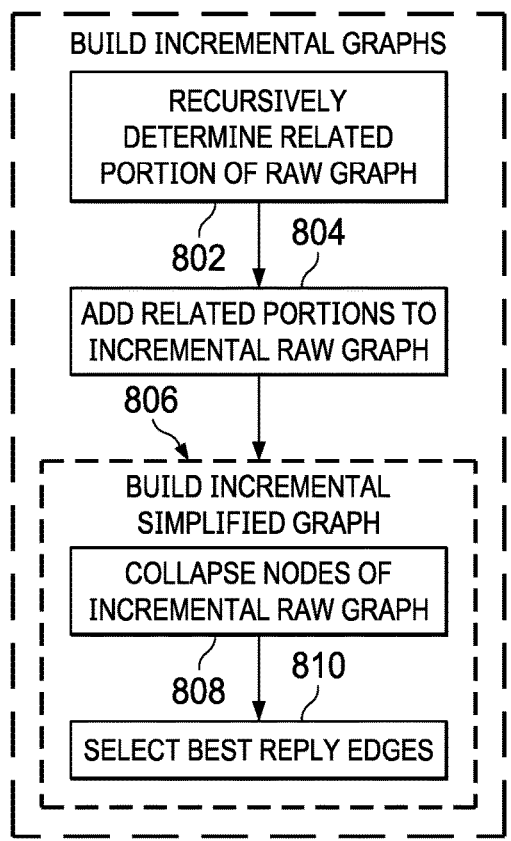
FIG. 8 is a flow diagram of one embodiment of a method for building incremental graphs.

Moving to FIG. 8, one embodiment of a method for building the remainder of the incremental graphs is depicted. Here, once the edges are determined and added to the incremental raw graph (e.g., as depicted in FIG. 7) the remainder of the incremental raw graph may then be determined and the simplified graph determined from the incremental raw graph. Specifically, each of the edges of the incremental raw graph can then be followed recursively using the raw graph, and each node and relationship transitively connected to an of the edge in the incremental raw graph in the raw graph may be added to the incremental raw graph (STEPS 802, 804). This recursive addition may serve to add adjacent edges and equivalent edges from the raw graph recursively. Here, each edge in the incremental raw graph can be accessed in the raw graph and followed to the next node, this node can then be added to the incremental raw graph, and each edge of that new node recursively added to the incremental raw graph. Thus, if an accessed node in the raw graph is a root node or a leaf node it will be added to the incremental raw graph and no further edges may exist in the raw graph to follow. At this point the incremental raw graph may include each newly determined node from the newly received email data. Moreover, for each newly determined node, the incremental raw graph may include all nodes that of the raw graph that are related (directly or indirectly) to the new node (e.g., based on the initial determined edges for that new node as determined through, for example, a textual comparison of emails or through email metadata).

Once the incremental raw graph is determined it can be used to determine incremental simplified graph (STEP 806) by collapsing the equivalent nodes of the incremental raw graph to get a single node in incremental simplified graph 125 representing all equivalent nodes in the incremental raw graph (STEP 808). This can be done, for example, using a COALESCE function or the like. Additionally, a best reply relationship edge may be selected for the simplified graph between any two nodes based on the sum of the weights of all the reply relationship edges between all equivalent nodes for those two nodes (e.g., the nodes collapsed to form those two nodes) in the incremental raw graph (STEP 810). The weights associated with the reply edges of the incremental raw graph can be used to select the best reply edges based on the similarity metric (e.g., based on the highest determined similarity) associated with each edge. Such a selection can be determined, for example, by a windowing function or the like. The determined best reply relationship edges are then added to the incremental simplified graph.

Figure 9:
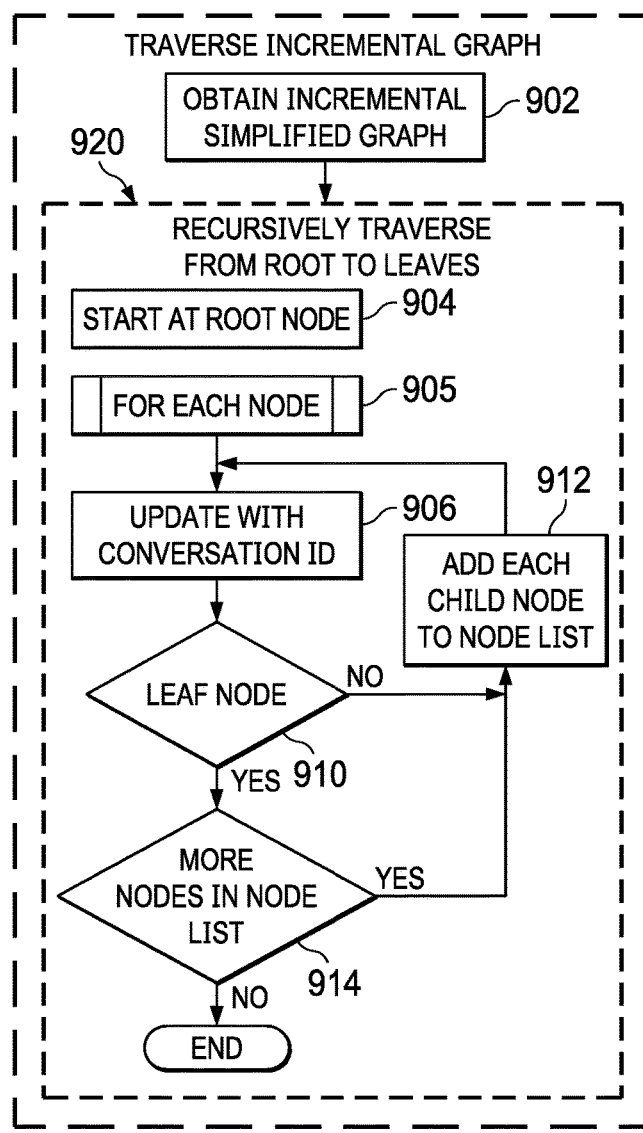
FIG. 9 is a flow diagram of one embodiment of a method for traversing an incremental graph.

This incremental simplified graph can then be traversed to determine conversations within the incremental simplified graph and assign identifiers to all the nodes of each conversation tree within the incremental simplified graph. One embodiment for a method for traversing the incremental graph is depicted in FIG. 9. In this embodiment, the incremental simplified graph can be obtained (STEP 902) and recursively traversed from the root node of each conversation tree in the simplified graph to the leaves of each conversation tree (STEP 920). Thus, such a traversal may determine each node of the incremental simplified graph that is a root node (e.g., a node that has no reply relationship edges specifying that node as a reply and representing an originator email) for a conversation tree and beginning with each of those root nodes traverse the associated conversation tree originating with the node. This traversal may serve to assign a conversation identifier to the conversation represented by the conversation tree associated with each root node and, in some embodiments, may impose a size limit to the conversations. Such a traversal may, in one embodiment, be done by a recursive common table expression (CTE) from the root nodes down to the leaves of a conversation tree in order to efficiently implement such a traversal.

Starting with the root node of the conversation tree then (STEP 904), each child node of the root node may be determined and added to a node list. For each of the nodes in the node list, that node can then be updated with the conversation identifier in the incremental simplified graph (STEP 906). In one embodiment, a conversation identifier may be, for example, an identifier of the root node (e.g., representing an originator email) of the conversation tree, such that the identifier for the root node is propagated to each of the nodes of that conversation tree subgraph during traversal. Additionally, in one embodiment a node level of the traversal may be tracked and incremented. Such a node level may be added to the node (e.g., as an attribute or property of the node) in the incremental simplified graph.

It can be determined if that node is a leaf node (STEP 910). If the node is a leaf node (Y branch of STEP 910), it can be determined if there are any more nodes in the node list (STEP 914). If there are no more nodes in the node list (N branch of step 914) the recursive traversal may terminate, while if there are more nodes in the node list (Y branch of STEP 914), the remaining nodes in the node list may be recursively traversed. If the node is not a leaf node (N branch of STEP 910) all the child nodes of that node currently being processed may be added to a list of nodes (STEP 912), and any remaining nodes in the node list recursively traversed (STEP 905). In one embodiment, the number of nodes in the current conversation tree may be tracked (e.g., by grouping the rows of a table comprising the incremental simplified graph) to determine if the number of nodes in the conversation tree exceeds some conversation size limit (e.g., 1000 nodes) and if the conversation size limit has been exceeded the traversal may stop. Once the traversal of the conversation trees of the incremental simplified graph is terminated, the updated incremental simplified graph may be determined and output (STEP 922).

Figure 10:
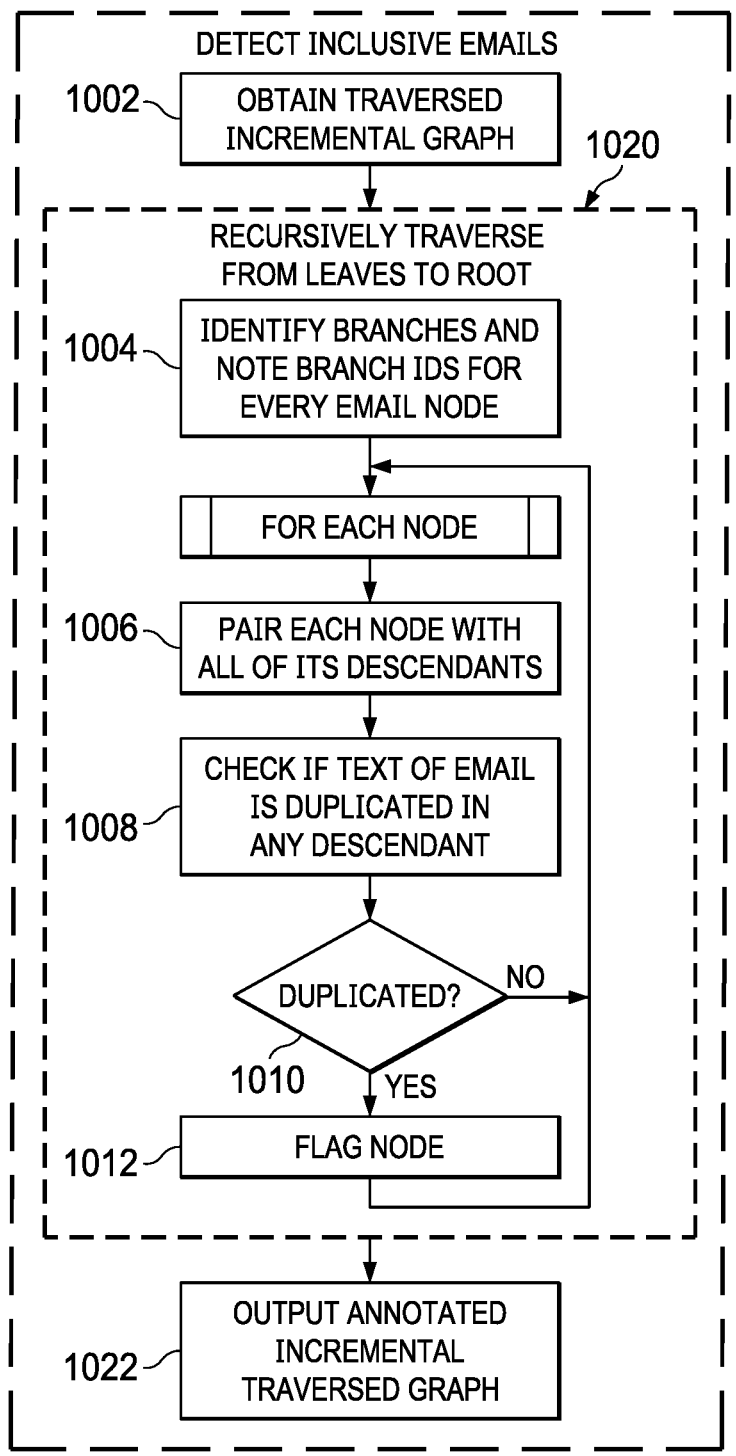
FIG. 10 is a flow diagram of one embodiment of a method for detecting inclusive emails in an incremental graph.

This incremental traversed simplified graph can then be evaluated to detect inclusive emails. FIG. 10 depicts one embodiment of a method for detecting inclusive emails using the incremental simplified graph. Once the traversed incremental simplified graph is obtained (STEP 1002), it can be traversed from the leaf nodes to the root node of the conversation tree (STEP 1020). Specifically, fora conversation tree in the incremental simplified graph each of the branches of the conversation tree may be identified (e.g., where a node of the conversation tree may be associated with one or more branches) (STEP 1004). Starting at a leaf node of the conversation tree, that branch may be followed upward until the root node of the conversation tree is reached, identifying each node of that branch with a branch identifier (e.g., which may be a node identifier of the leaf node which is the termination of that branch). Again, such a traversal may be accomplished with a recursive common table expression. Accordingly, each of the branches (e.g., comprising a set of nodes and relationships of a path through the conversation tree between a leaf node of the conversation tree and the root node of the conversation tree) of the conversation tree may be identified and placed in a branch table.

The text of the emails of each identified branch of the conversation tree can then be analyzed to determine if the text of any email represented by a node of the branch is duplicated in any descendant of the branch. Based on this determination, the nodes of the branch may be annotated indicated if the email represented by the node is inclusive or subsumed. To accomplish this, the branch table with the branches for the conversation tree may be joined with the text segments to facilitate comparison. Each node of a branch can then be paired with all of its descendants (STEP 1006). For example, a self-join leveraging the branch identifier for the branch and a node level for each node (e.g., as identified during a previous traversal as discussed) each node may be paired with all of its descendants. The emails associated with each of the paired nodes (e.g., a node and its descendants) can then be checked to determine if an email is duplicated in any descendant email (STEP 1008). This determination can be made by comparing the text segments associated with each of the emails associated with those nodes to determine if the text of the email represented by one of the nodes is duplicated in any of the descendant nodes (STEP 1010). If the text is duplicated (Y branch of STEP 1010) the node representing the email which includes the duplicated content may be indicated (e.g., flagged or otherwise annotated) as inclusive (STEP 1012). Otherwise other nodes of the branches may be processed.

This annotated traversed incremental simplified graph can then be output for use in presenting an interface corresponding to any of the conversations trees represented in the incremental simplified graph (STEP 1022). Moreover, the incremental raw graph and the incremental simplified graph may then be used to update the raw graph and simplified graph respectively such that both the raw graph and the simplified graph may be incrementally updated based on newly received email data. Specifically, the subgraphs of the incremental raw graph and the annotated conversation trees of the incremental simplified graph may be substituted for the corresponding subgraphs and conversation trees in the raw graph and the simplified graph, respectively.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein. Rather, the description is intended to describe illustrative embodiments, features and functions in order to provide a person of ordinary skill in the art context to understand the invention without limiting the invention to any particularly described embodiment, feature, or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a CPU, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines, or portions thereof described herein, where such software programming or code can be stored in a computer-readable medium and can be operated on by a processor to permit a computer to perform any of the steps, operations, methods, routines, or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, HDs, data cartridges, magnetic tapes, floppy diskettes, flash memory drives, optical data storage devices, CD-ROMs, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals, or other information. A processor can include a system with a general-purpose CPU, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, that follow, a term preceded by "a set", "a" or "an" (and "the" when antecedent basis is "a" or "an") includes both singular and plural of such term, unless clearly indicated otherwise (i.e., that the reference "a set", "a" or "an" clearly indicates only the singular or only the plural). Also, as used in the description herein the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:

1. A system for document analysis, comprising:
a processor;
a data store, having an email graph; and
a non-transitory computer readable medium instructions for incrementally updating the email graph, by:
obtaining email data;
determining an incremental graph comprising a set of nodes representing emails and edges representing relationships between the emails, the determination of the incremental graph comprising:
determining a first node for the incremental graph, wherein the first node represents a first email determined from the obtained email data;
adding the first node to the incremental graph;
determining one or more edges for the incremental graph, wherein the one or more edges include at least one edge determined by:
determining a candidate edge for the incremental graph based on a comparison of first text of the first email to second text of a second email represented by a second node in the email graph or the incremental graph; and
adding the candidate edge to the incremental graph as one of the one or more edges;
starting with the one or more edges in the email graph, traversing the email graph to determine a related set of nodes and a related set of edges of the email graph to add to the incremental graph, wherein the related set of nodes and a related set of edges of the email graph are directly or indirectly related to the one or more edges; and
adding the related set of nodes and related set of edges determined from the email graph to the incremental graph;
traversing the incremental graph to identify a set of conversations in the incremental graph, each of the set of conversations comprising a subgraph of the incremental graph; and
updating the identified set of conversations in the email graph based on the incremental graph to incrementally update the email graph based on the obtained email data.

2. The system of claim 1, wherein the data store comprises a columnar data store.

3. The system of claim 2, wherein the data store is part of a database system comprising a database system including a database engine, wherein the incremental graph is determined at least partially using the database engine.

4. The system of claim 1, wherein the email graph comprises a raw graph and a simplified graph, and the incremental graph comprises an incremental raw graph and an incremental simplified graph.

5. The system of claim 4, wherein the incremental simplified graph is determined by collapsing the nodes and edges of the incremental raw graph.

6. The system of claim 5, wherein the incremental simplified graph is traversed to identify the set of conversations in the incremental graph.

7. The system of claim 6, comprising traversing the subgraph of each conversation to identify each node of the conversation for the subgraph that represents an inclusive email.

8. A method for document analysis, comprising:
storing an email graph; and
incrementally updating the email graph, by:
obtaining email data;
determining an incremental graph comprising a set of nodes representing emails and edges representing relationships between the emails, the determination of the incremental graph comprising:
determining a first node for the incremental graph, wherein the first node represents a first email determined from the obtained email data;
adding the first node to the incremental graph;
determining one or more edges for the incremental graph, wherein the one or more edges include at least one edge determined by:
determining a candidate edge for the incremental graph based on a comparison of first text of the first email to second text of a second email represented by a second node in the email graph or the incremental graph; and
adding the candidate edge to the incremental graph as one of the one or more edges;
starting with the one or more edges in the email graph, traversing the email graph to determine a related set of nodes and a related set of edges of the email graph to add to the incremental graph, wherein the related set of nodes and a related set of edges of the email graph are directly or indirectly related to the one or more edges; and
adding the related set of nodes and related set of edges determined from the email graph to the incremental graph;
traversing the incremental graph to identify a set of conversations in the incremental graph, each of the set of conversations comprising a subgraph of the incremental graph; and
updating the identified set of conversations in the email graph based on the incremental graph to incrementally update the email graph based on the obtained email data.

9. The method of claim 8, wherein the data store comprises a columnar data store.

10. The method of claim 8, wherein the data store is part of a database system comprising a database system including a database engine, wherein the incremental graph is determined at least partially using the database engine.

11. The method of claim 8, wherein the email graph comprises a raw graph and a simplified graph, and the incremental graph comprises an incremental raw graph and an incremental simplified graph.

12. The method of claim 11, wherein the incremental simplified graph is determined by collapsing the nodes and edges of the incremental raw graph.

13. The method of claim 12, wherein the incremental simplified graph is traversed to identify the set of conversations in the incremental graph.

14. The method of claim 13, comprising traversing the subgraph of each conversation to identify each node of the conversation for the subgraph that represents an inclusive email.

15. A non-transitory computer readable medium comprising instructions for document analysis, comprising instructions for:

storing an email graph; and incrementally updating the email graph, by:

obtaining email data;

determining an incremental graph comprising a set of nodes representing emails and edges representing relationships between the emails, the determination of the incremental graph comprising:

determining a first node for the incremental graph, wherein the first node represents a first email determined from the obtained email data;

adding the first node to the incremental graph;

determining one or more edges for the incremental graph, wherein the one or more edges include at least one edge determined by:

determining a candidate edge for the incremental graph based on a comparison of first text of the first email to second text of a second email represented by a second node in the email graph or the incremental graph; and adding the candidate edge to the incremental graph as one of the one or more edges;

starting with the one or more edges in the email graph, traversing the email graph to determine a related set of nodes and a related set of edges of the email graph to add to the incremental graph, wherein the related set of nodes and a related set of edges of the email graph are directly or indirectly related to the one or more edges; and adding the related set of nodes and related set of edges determined from the email graph to the incremental graph;

traversing the incremental graph to identify a set of conversations in the incremental graph, each of the set of conversations comprising a subgraph of the incremental graph; and updating the identified set of conversations in the email graph based on the incremental graph to incrementally update the email graph based on the obtained email data.

16. The non-transitory computer readable medium of claim 15, wherein the data store comprises a columnar data store.

17. The non-transitory computer readable medium of claim 16, wherein the data store is part of a database system comprising a database system including a database engine, wherein the incremental graph is determined at least partially using the database engine.

18. The non-transitory computer readable medium of claim 15, wherein the email graph comprises a raw graph and a simplified graph, and the incremental graph comprises an incremental raw graph and an incremental simplified graph.

19. The non-transitory computer readable medium of claim 18, wherein the incremental simplified graph is determined by collapsing the nodes and edges of the incremental raw graph.

20. The non-transitory computer readable medium of claim 19, wherein the incremental simplified graph is traversed to identify the set of conversations in the incremental graph.

21. The non-transitory computer readable medium of claim 20, comprising traversing the subgraph of each conversation to identify each node of the conversation for the subgraph that represents an inclusive email.

\* \* \* \* \*